US009151855B2

(12) United States Patent
Spencer et al.

(10) Patent No.: US 9,151,855 B2
(45) Date of Patent: Oct. 6, 2015

(54) BARRIER DETECTION SYSTEM AND METHOD

(75) Inventors: Glenn Spencer, Hereford, AZ (US); Michael S. King, Saint David, AZ (US)

(73) Assignee: Ardmore Associates, LLC

( * ) Notice: Subject to any disclaimer, the term of this patent is extended or adjusted under 35 U.S.C. 154(b) by 871 days.

(21) Appl. No.: 13/424,214

(22) Filed: Mar. 19, 2012

(65) Prior Publication Data

US 2012/0236688 A1  Sep. 20, 2012

Related U.S. Application Data

(60) Provisional application No. 61/453,886, filed on Mar. 17, 2011.

(51) Int. Cl.
  *G01V 1/30* (2006.01)
  *G01V 1/24* (2006.01)

(52) U.S. Cl.
  CPC . *G01V 1/30* (2013.01); *G01V 1/242* (2013.01)

(58) Field of Classification Search
  CPC .................................. G01V 1/24; G01V 1/30
  See application file for complete search history.

(56) References Cited

U.S. PATENT DOCUMENTS

| | | | |
|---|---|---|---|
| 3,109,165 A | | 10/1963 | Bango |
| 3,261,009 A | | 7/1966 | Stetten et al. |
| 3,984,803 A | | 10/1976 | Hawk et al. |
| 4,001,771 A | * | 1/1977 | Amrine et al. ............... 367/129 |
| 4,107,660 A | | 8/1978 | Chleboun |
| 4,374,378 A | | 2/1983 | Lee |
| 4,991,146 A | | 2/1991 | Ransdell et al. |
| 5,969,608 A | | 10/1999 | Sojdehei et al. |
| 6,345,108 B1 | * | 2/2002 | Faraj .............................. 382/109 |
| 6,529,130 B2 | | 3/2003 | Pakhomov |
| 6,664,894 B2 | | 12/2003 | Pakhomov |
| 7,202,797 B2 | * | 4/2007 | Zhavi ......................... 340/686.1 |
| 7,573,384 B2 | | 8/2009 | Tonelli |
| 2008/0195358 A1 | * | 8/2008 | El Ouair et al. ................... 703/2 |
| 2011/0002194 A1 | * | 1/2011 | Imhof et al. .................... 367/53 |

OTHER PUBLICATIONS

Felzer, Decay of aftershock density with distance indicates triggering by dynamic stress., Nature, 441,735-738, 2006, pp. 1-7.*
International Search Report, mailed Nov. 1, 2012.
Senstar Corporation, Architectural & Engineering Specification for Fiber Optic Cable Fence Disturbance Sensor, Mar. 2010, 12 pages, C6DA0415-001, Rev-B, published in Canada.
Alex Pakhomov, Al Sicignano, Matt Sandy, Tim Goldburt, Current Seismic Sensor Issues for Defense and Security Applications, Proc. of SPIE, vol. 5403, pp. 576-581, SPIE, WA.

* cited by examiner

*Primary Examiner* — Isam Alsomiri
*Assistant Examiner* — Hovhannes Baghdasaryan
(74) *Attorney, Agent, or Firm* — Greenberg Traurig, LLP

(57) ABSTRACT

Embodiments of the invention provide a barrier detection system that includes a plurality of sensors that are coupled in series to a seismograph. The seismograph receives a signal from the sensors. The system includes a computer system including computer storage and a processor. The computer system is in communication with the seismograph so that the computer system receives signals from seismograph and stores them in the computer storage. The system can include an object detection system that can process the signals received by the computer system from the seismograph. The object detection system can select a first portion of the signal to analyze based a predetermined time interval, create a baseline value for the first portion, and select a plurality of peaks from the first portion. The object detection can also analyze an amplitude, frequency, and periodicity of the first portion to assess the origin of the signal.

20 Claims, 8 Drawing Sheets

BARRIER DETECTION SYSTEM AND METHOD

RELATED APPLICATIONS

This application claims priority under 35 U.S.C. §119 to U.S. Provisional Patent Application No. 61/453,886 filed on Mar. 17, 2011, the entire contents of which is incorporated herein by reference.

BACKGROUND

Creating barriers to securely enclose a space or maintain a border can be a difficult task. For larger barriers, such as state or international border lines, mechanical fences can be costly to maintain and may be easily penetrated. For this reason, human patrol by foot, by vehicle, and by air is often utilized. This type of security is limited by the number of patrol personnel available and potential threats to patrol personnel's safety.

SUMMARY

Some embodiments of the invention provide a barrier detection system that can include a plurality of sensors that can be coupled in series to a seismograph. In some embodiments, the seismograph can receive a signal from the sensors. In some embodiments, the barrier detection system can include a computer system that can include computer storage and a processor. In some embodiments, the computer system can be in communication with the seismograph so that the computer system receives signals from seismograph and stores at least a portion of the signals in the computer storage. In some embodiments, the computer system can include an object detection system that can process the signals received by the computer system from the seismograph. In some embodiments, the object detection system can be configured to analyze at least some portions of the signal to assess an origin of the signal.

DETAILED DESCRIPTION

Figure 1:
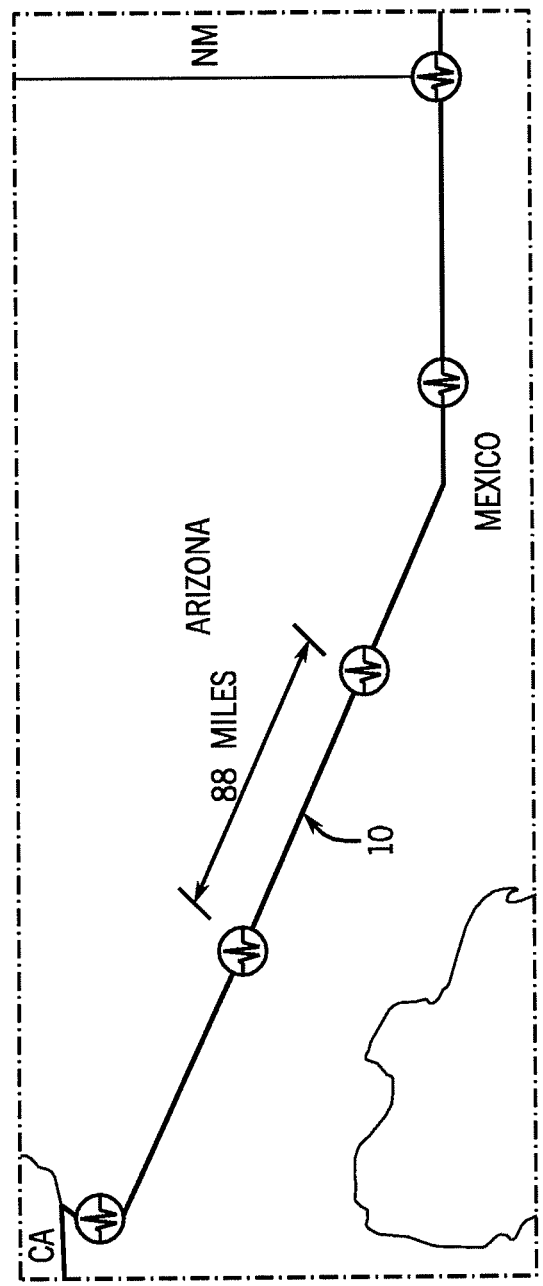
FIG. 1 is a perspective view of a barrier detection system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2A:
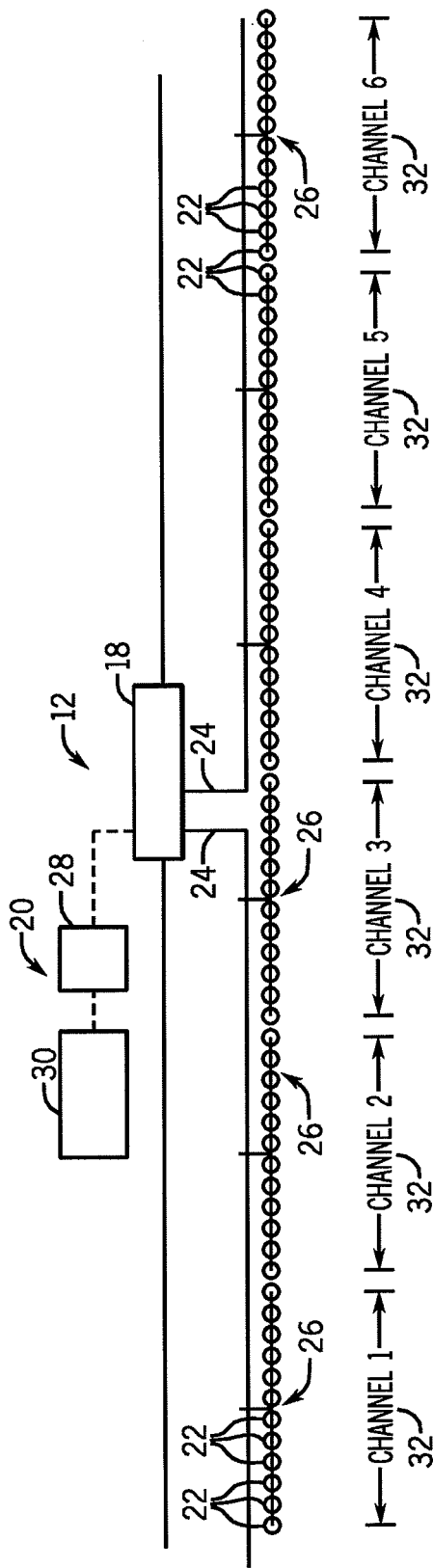
FIG. 2A is a schematic view of an element of the barrier detection system of FIG. 1.
Figure 3:
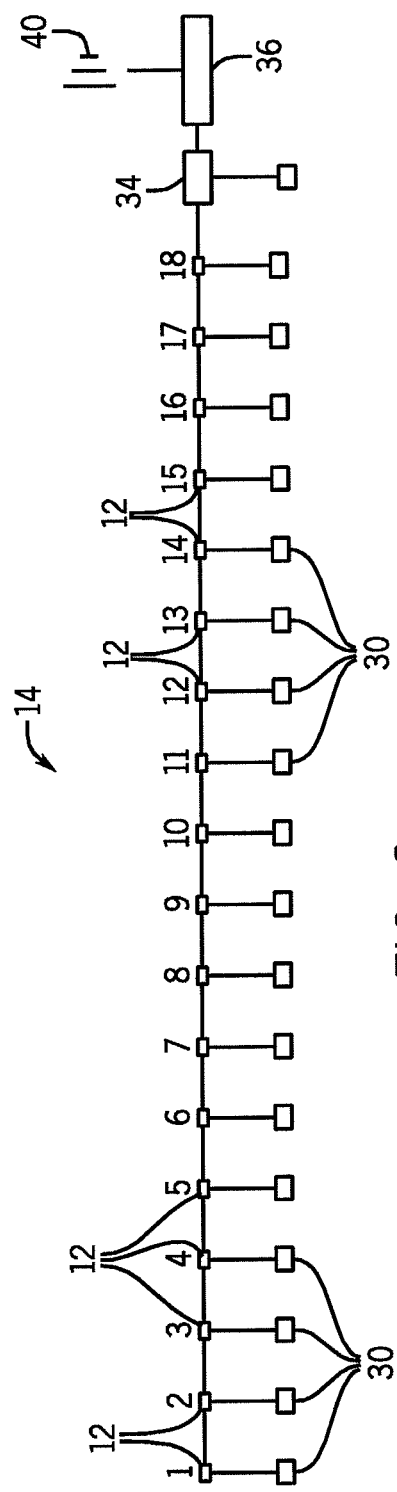
FIG. 3 is a schematic view of a segment of the barrier detection system of FIG. 1.
Figure 4:
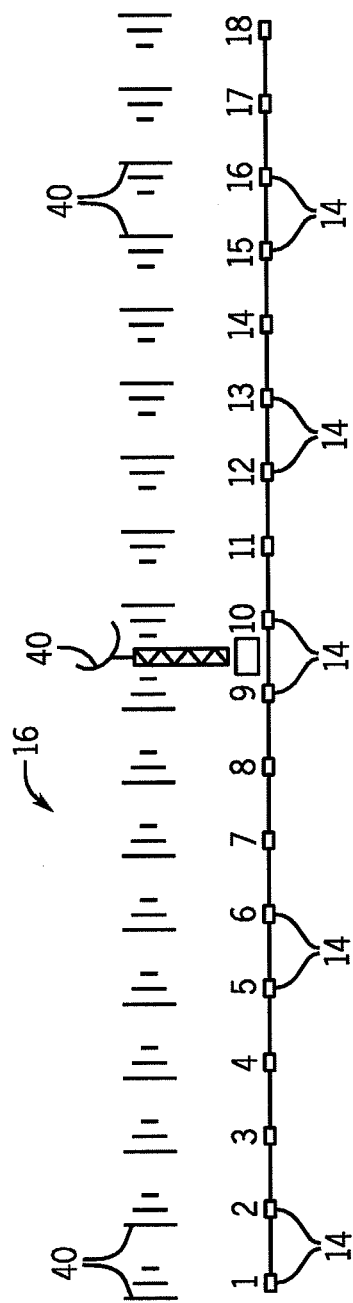
FIG. 4 is a schematic view of a block of the barrier detection system of FIG. 1.

FIG. 1 illustrates a barrier detection system 10 according to one embodiment of the invention. The system 10 can include one or more elements 12, as shown in FIG. 2A. The system 10 can also include one or more segments 14, as shown in FIG. 3, each of which can comprise one or more elements 12. The system 10 can also include one or more blocks 16, as shown in FIG. 4, each of which can comprise one or more segments 14. In some embodiments, the blocks 16 can traverse a length of land to define a virtual border line. As described below, the system 10 can detect when objects, such as humans, animals, vehicles, aircraft, etc. cross the virtual border line.

As shown in FIG. 2A, each element 12 can include a seismograph 18, a power source 20, and one or more sensors 22, such as geophones. In some embodiments, the geophones 22 can be buried a distance underground. In some embodiments, the geophones 22 can be buried between about 18 inches and about 36 inches underground, although in other embodiments, the geophones 22 can be buried other distances underground, at least partially depending on the operating parameters of the geophones 22 and local environmental conditions. In some embodiments, at least a portion of the geophones 22 can be oriented substantially perpendicular to the physical boarder to enable sufficient receipt of signals transmitted from potential targets or objects moving near the system 10.

Also, in some embodiments, the geophones 22 and/or other elements of the system 10 can comprise a dampener (not shown). For example, in some embodiments, elements of the system 10, including, but not limited to the geophones 22, can be positioned adjacent a dampener, such as Styrofoam® or another substance that can be configured and arranged to dampen a portion of the signals received. In some embodiments, the dampening can enhance signal analysis. For example, the ability of the system 10 to detect a directional origin of the signal can be at least partially enhanced by disposing one or more geophones 22 adjacent to one or more dampeners.

In some embodiments, a number of geophones 22 can be connected together via one or more cables 24 (e.g., multiplex cables, fiber-optic cables, etc.) that can also buried underground. As result, in some embodiments, a geophone string 26 can comprise a plurality of geophones 22 coupled together. In some embodiments, twelve geophones 22 can be connected together to create a geophone string 26, although in other embodiments, the number of geophones 22 can comprise other numbers and can vary according to desired application. In some embodiments, an element 12 can comprise a series of geophone strings 26, such as six geophone strings 26 spaced apart and coupled together, as shown in FIG. 2A, although, in other embodiments, an element 12 can comprise more or fewer geophone strings 26. Moreover, in some embodiments, some elements 12 of the same system 10 can comprise different numbers of geophones 22 and geophone strings 26. In some embodiments, some or all of the geophone strings 26 can be coupled to one or more seismographs 18, which can be powered by the power source 20. In one embodiment, the power source 20 can comprise a battery 28 charged by a solar panel 30, as shown in FIG. 2A. In some embodiments, the power source 20 can comprise a power grid (not shown) (e.g., the system 10 can be coupled to a power grid of a local utility.

In some embodiments, at least some geophones 22 can be buried in the ground approximately 20 feet apart. As a result, at least some of the geophone strings 26 can span a distance of about 240 feet (e.g., two geophone strings 26 comprising six geophones 22 each) and an element 12, which comprises about seventy-two geophones 22 (e.g., six geophone strings 26 including 12 geophones 22 in each geophone string 26), can span a distance of about 1,440 feet. In addition, in some embodiments, geophone strings 26 may buried in a linear and/or a non-linear pattern (e.g., at least a portion of the elements 12 may follow a straight, bent, or curved virtual border line). Further, in some embodiments, the system 10 can comprise at least one seismograph 18 and at least one power source 20 per mile.

Figure 2B:
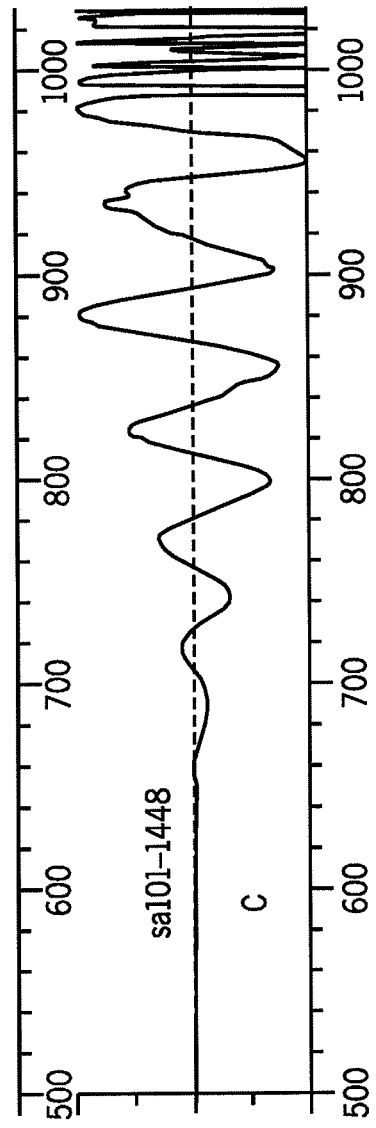
FIG. 2B is an illustration of a voltage of the barrier detection system of FIG. 1.

In some embodiments, in operation, seismic signals can be detected by some or all of the geophones 22. For example, when the ground moves (e.g., in response to a person or animal walking within an area near to a geophone 22), the geophones 22 can convert the seismic response (e.g., the ground motion) to a voltage signal. As shown in FIG. 2B, each geophone string 26 can provide a voltage signal to one or more seismographs 18. In some embodiments, the seismograph 18 can receive and record the voltage signals from the geophone strings 26 over time. Further, in some embodiments, each seismograph 18 can comprise a plurality of channels 32 (e.g., six channels 32, as shown in FIG. 2A) so that the seismographs 18 can receive voltage signals from each of the separate channels 32 (e.g., where each channel 32 generally corresponds to a geophone string 26). Moreover, in some embodiments, approximately one-half of the geophone strings 26 of an element 12 can extend from a first side of a seismograph 18 and another one-half of the geophone strings 26 can extend from another portion of the same seismograph 18 (e.g., the seismograph 18 can be disposed between two sets of geophone strings 26 to form the element 12, as shown in FIG. 2A).

In some embodiments, in addition to being configured and arranged substantially similarly to a conventional seismograph 18, the seismograph 18 can comprise additional capabilities. For example, in some embodiments, some or all of the seismographs 18 can be configured and arranged to at least partially process the voltage signals received. In some embodiments, the seismographs 18 can be configured and arranged to convert the analog voltage signals received from the geophones strings 26 and cables 24 to a digital signal. Moreover, in some embodiments, some or all of the seismographs 18 can be configured and arranged to filter out at least a portion of the signals generated from background activity. By way of example only, some seismographs 18 can be disposed adjacent to power lines or other objects that can emit a background amount of energy that could lead to activation of the system 10. The power lines can emit energy at a frequency of about 60 Hertz (Hz), which, as discussed below is different from the frequency associated with human movement. Accordingly, in some embodiments, the seismographs 18 can be configured and arranged to filter out signals at around 60 Hz to reduce the potential for false positives.

Figure 5:
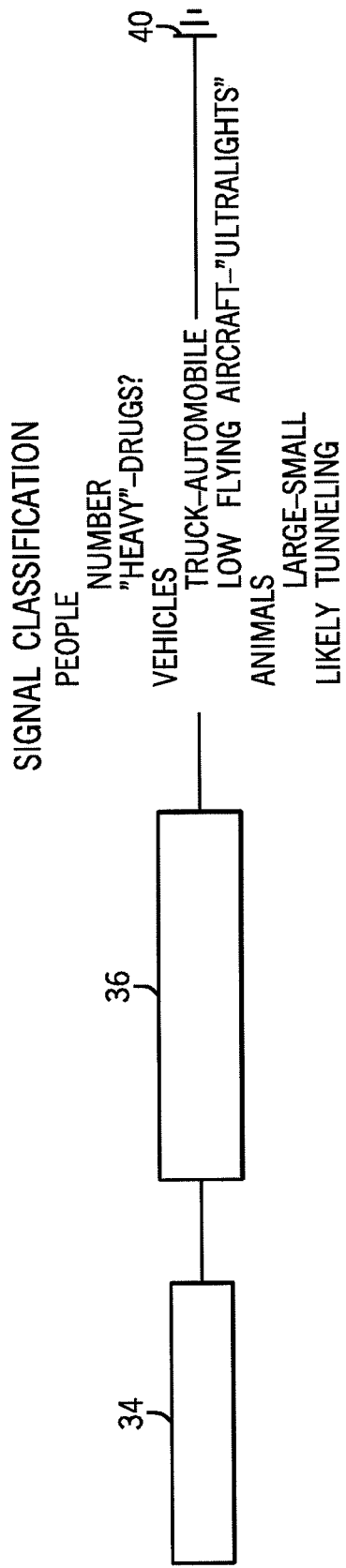
FIG. 5 illustrates a sequence of data flow from the barrier detection system of FIG. 1.

As shown in FIG. 3, in some embodiments, a segment 14 can comprise a plurality of elements 12 (e.g., eighteen elements 12) coupled together by one or more cables 24. The elements 12 can be coupled to a line takeoff unit 34, which can receive the signal recordings (i.e., of the voltage signals) from the seismographs 18 coupled to the elements 12 and communicate the signal recordings to a computer system 36. For example, in some embodiments, the line takeoff unit 34 can comprise the computer system 36. In some embodiments, the line takeoff unit 34 can be in communication (e.g., wired and/or wireless communication) with the computer system 36. In some embodiments, the computer system 36 can comprise a conventional computer system 36 configuration (e.g., the computer system 36 can comprise a processor and computer storage). The computer storage can physically store the signal recordings as well as one or more applications executable by the processor. The applications can be executed to process the signal recordings. For example, the signal recordings can be digitized (e.g., by an analog to digital converter) and an object detection system 38, as detailed below, can be applied to the digitized recordings in order to classify the movement recorded within a category corresponding to what most likely caused the ground vibrations. As shown in FIG. 5, categories can include, but are not limited to, people, vehicles, animals, and tunneling. In addition, one or more of the categories can include subcategories into which the signals can be classified, such as a heavy or a light distinction within the people category (e.g., indicating one person crossing or multiple people crossing), truck, automobile, or aircraft distinctions within the vehicle category, large or small distinctions within the animal category, etc. Also, in some embodiments, insignificant movement and/or undetermined movement (e.g., which does not fall into any of the previously mentioned categories) can be classified in separate categories (e.g., an "other" category and/or a "background" category).

For example, each category and subcategory can include a unique signature of voltage signals recorded by the geophones 22. The signatures can be previously stored within the computer system 36 (i.e., the signatures can be physically stored in the computer storage) and the processor can apply the object detection system 38 to some or all of the measured incoming signal recordings to assess whether the incoming signal recordings are significantly similar to any of the unique signatures stored in the computer storage. Accordingly, movement detected within an area near the geophone 22 locations can be classified within the appropriate category.

Figure 6:
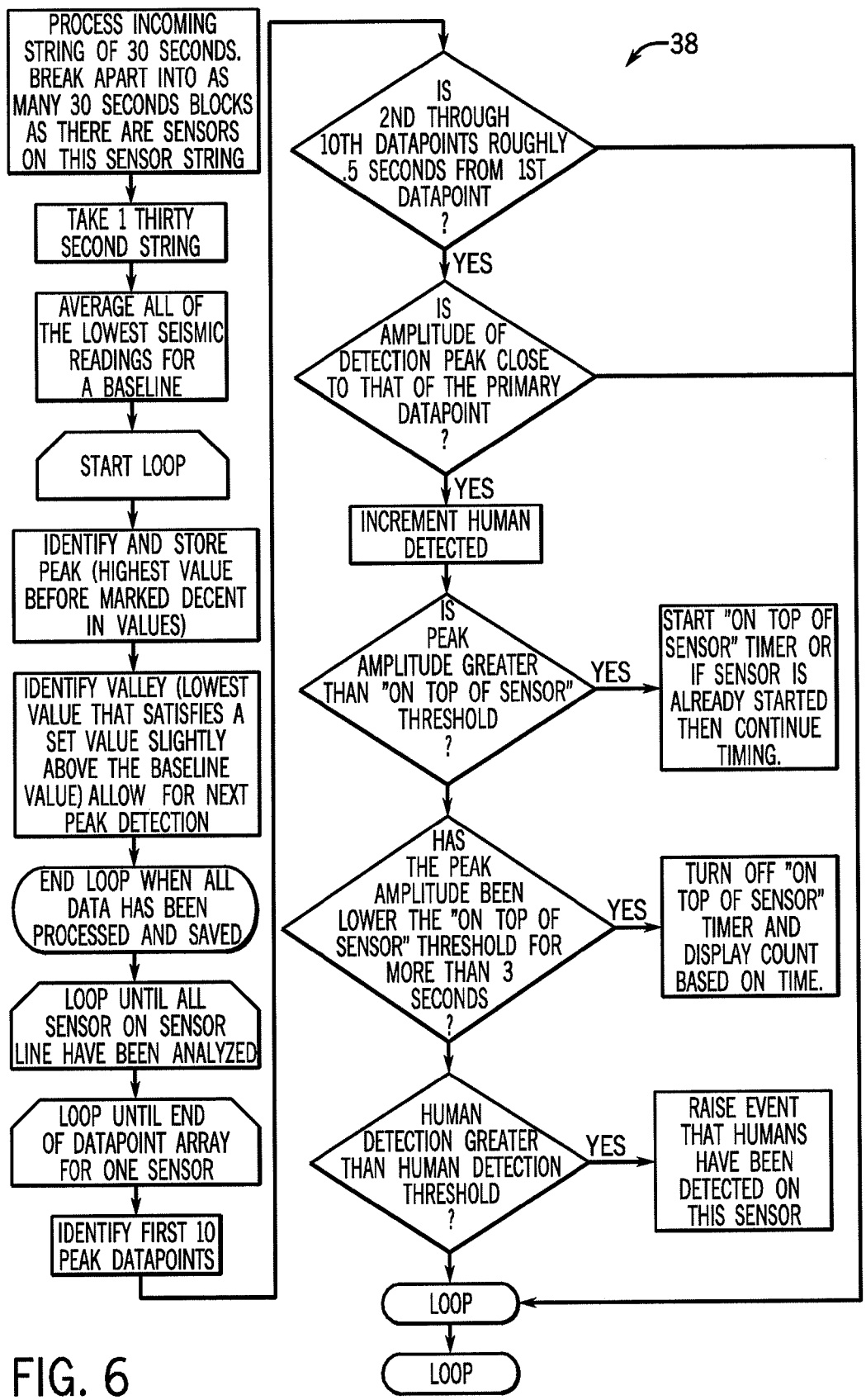
FIG. 6 is a flow chart depicting an object detection system employed by the barrier detection system of FIG. 1.

According to some embodiments of the invention, the object detection system 38 employed by the system 10 can comprise multiple steps, as shown in FIG. 6. In some embodiments, at least one step of the object detection system 38 can comprise analyzing a portion of the signal data based on time. By way of example only, in some embodiments, a user can analyze thirty seconds of data at a time, which can allow the user to gain a dynamic perspective of events occurring relatively near to and/or adjacent to portions of the system 10. In other embodiments, greater or lesser time periods can be employed in the object detection system 38. Moreover, in some embodiments, the object detection system 38 can be configured and arranged to sample the data (e.g., thirty seconds of data) at predetermined intervals. For example, in some embodiments, the object detection system 38 can sample the data at intervals of about every millisecond to develop a relatively complete perspective of the activities adjacent to the system 10.

In some embodiments, the object detection system 38 can be configured and arranged to analyze a voltage signal baseline. For example, in some embodiments, the temporal-based data (e.g., thirty seconds of data) can be divided into approximately as many data sets as geophones 22 combined in the geophone string 26 transmitting the data. In some embodiments, the computer system 36 executing the object detection system 38 can determine a general baseline signal of the area into which the geophones 22 are buried by analyzing and averaging the generally lower intensity signals from the string of geophones 22. Additionally, in some embodiments, the signal data can also be passed through a conventional low-pass filter (not shown), which can substantially reduce high frequency background signal to at least partially improve data analysis.

In some embodiments, after determining a baseline, the computer system 36, via the object detection system 38 can begin substantive analysis of signal readings originating from the geophones 22. In some embodiments, the object detection system 38 can be configured and arranged to detect signal peaks and valleys, as shown in the data reading in FIG. 2B, which can potentially signal the presence of people, vehicles, animals, tunneling, etc. In some embodiments, the computer system 36, by applying the object detection system 38, can analyze an initial number of peaks and an amplitude of those peaks. In some embodiments, ten peaks and their respective amplitudes can be analyzed, and in other embodiments, a different number of peaks can be used. Although future discussion of peaks and peak amplitudes includes ten peaks, as previously mentioned, the object detection system 38 can analyze other numbers of peaks in the logic steps discussed below.

In some embodiments, the ten peaks can be analyzed to determine whether a constant periodicity and/or frequency relationship exists between them. By way of example only, generally, human movement comprises a frequency of about 2 Hz and a periodicity of about 0.5 seconds, and, as a result, the object detection system 38 can apply this constant to determine whether a human is relatively near to portions of the system 10 (e.g., one or more geophones 22). In some embodiments, the object detection system 38 can also assess the frequency and/or the periodicity for other categories (e.g., cars, trucks, tunneling objects, animals, etc.) to determine the appropriate category of the item detected by the system 10. In some embodiments, the computer system 36, by applying the object detection system 38, can determine whether the signal from the geophones 22 includes a frequency and/or periodicity similar to the 2 Hz and/or 0.5 seconds. Furthermore, in some embodiments, the object detection system 38 can employ generally typical frequencies and/or amplitudes to discern whether or not a signal potentially arises from a target of interest (e.g., a human or a vehicle) or a target not necessarily of interest (i.e., an animal). For example, the gait of some animals generates a signal comprising a generally lesser amplitude and a frequency different than the 2 Hz previously mentioned. Also, other potential targets can generate other amplitudes and frequencies. For example, a vehicle can generate signals comprising an increased frequency and an increased amplitude relative to human movement because of the generally increased speeds as well as the generally greater weight components contacting the ground, which can be sensed by some or all of the geophones 22.

Figure 8:
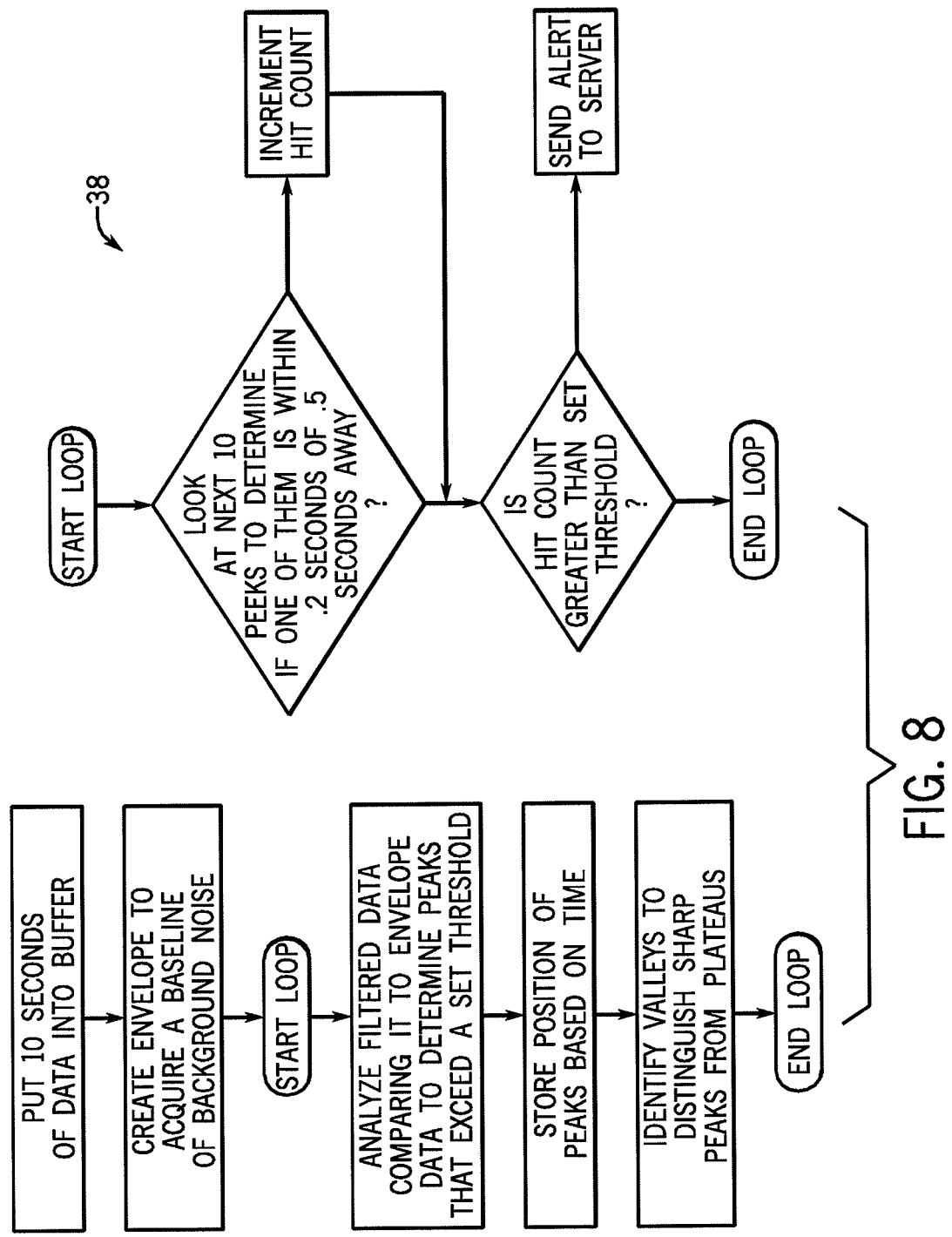
FIG. 8 is a flow chart depicting a portion of object detection system employed by the barrier detection system of FIG. 1.

In some embodiments, the object detection system 38 can comprise additional configurations for periodicity analysis, as shown in FIG. 8. In some embodiments, the object detection system 38 can be configured and arranged to analyze a signal baseline. For example, in some embodiments, the temporal-based data (e.g., ten seconds of data) can be segregated into a buffer and the object detection system 38 can create an envelope or other organizational structure to assess a baseline of background signals. Additionally, in some embodiments, the signal data can also be passed through one or more filters and the signal data can then be compared to the envelope data to assess whether peaks of the data exceed a predetermined threshold. If the data includes peaks that exceed the predetermined threshold, the position of the peaks can be stored based on timing and the stored data can be further analyzed to assess data integrity (e.g., identifying valleys between peaks to distinguish distinct peaks from signal plateaus).

In some embodiments, the computer system 36 applying the object detection system 38 can analyze the amplitude of the signal. In some embodiments, the object detection system 38 can assess whether the amplitude changes according to a predicted model. In some embodiments, as a human, or other moving target, moves toward or away from the system 10, the amplitude of their respective signal can change. As a target moves closer to the geophones 22, the system 10 can receive a signal with a generally increasing energy reading because of the decreasing distance between the target and the system 10. As a result, the amplitude (i.e., a measurement of the energy detected) can increase as the target moves closer to the system 10, and in some embodiments, can decrease as the target moves further from the system 10.

In some embodiments, the computer system 36 applying the object detection system 38 can assess whether the amplitude of the signal generally satisfies certain criteria. As previously mentioned, the closer that a target moves toward the geophones 22, generally, the larger the amplitude of the signal generated by the target should become. In some embodiments, the computer system 36, using the object detection system 38, can determine whether the amplitude of a peak of a signal exceeds a predetermined threshold. In some embodiments, the amplitude of a peak can be compared to an amplitude threshold pre-programmed into the system 36 (i.e., physically stored in the computer storage). For example, in some embodiments, the amplitude threshold can be compared to the signal amplitude, and, if the signal amplitude exceeds the amplitude threshold, the computer system 36 applying the object detection system 36 can initiate a timer to begin tracking the signal.

In some embodiments, other peaks in the sequence (i.e., a ten-peak sequence, as previously mentioned) can also be compared relative to the predetermined amplitude threshold. In some embodiments, if the amplitudes of some of the other peaks of the sequence comprise an amplitude generally lower than the amplitude threshold for a certain amount of time (e.g., three seconds), the timer can be deactivated and the object detection system 38 can calculate the frequency and periodicity to make a determination of what type of moving body the system 10 detected (i.e., human, animal, vehicle, etc), as shown in FIGS. 6 and 8.

Figure 7:
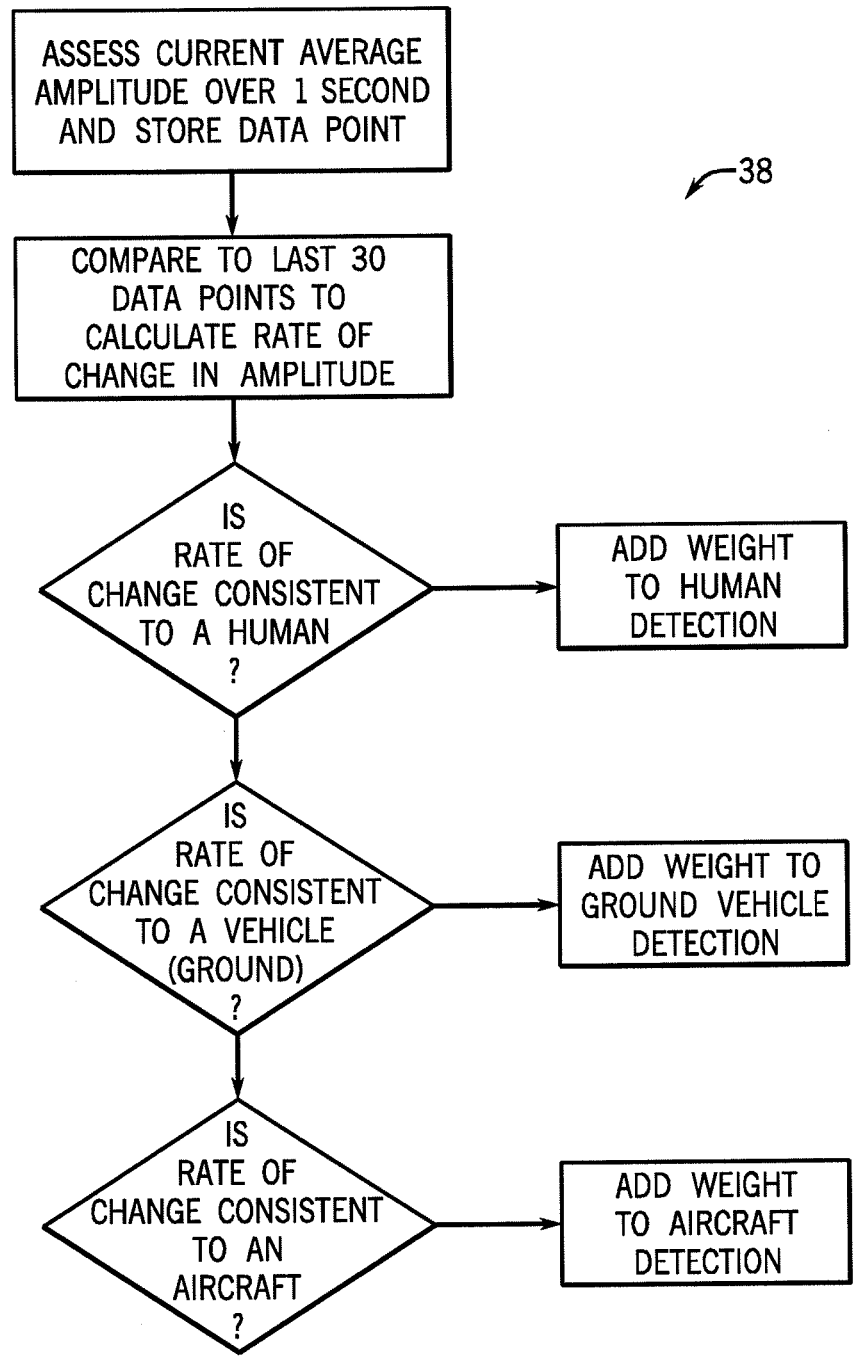
FIG. 7 is a flow chart depicting a portion of object detection system employed by the barrier detection system of FIG. 1.

As shown in FIG. 7, in some embodiments, a rate of change of the amplitude can also be used in addition to, or in lieu of, the amplitude analysis previously mentioned. By analyzing the rate of change of the amplitude, the object detection system 38 can further potentially determine a source of the seismic activity. As previously mentioned, the amplitude of a signal can be generally correlated with the amount of energy delivered to the ground by a potential target. Accordingly, the system 10 will detect a greater amplitude for targets such as vehicles than for targets such as humans. Moreover, because vehicles generally move at greater speeds than do humans and other animals, by analyzing the rate of change of the amplitude, the computer system 36, using the object detection system 38, can determine whether the signal originates from a vehicle or human source.

As shown in FIG. 7, by executing the object detections system 38, the computer system 36 can assess a rate of change of the amplitude of a signal. For example, as shown in FIG. 7, the object detection system 38 can initially assess a current average amplitude of a period of time and store the averaged data. In some embodiments, as shown in FIG. 7, the period of time can comprise about one second, however, in other embodiments, the period of time can comprise any other time frame that can provide useful data for analysis. In some embodiments, object detection system 38 can the compare the stored averaged amplitude data to amplitude data from some recent data points. For example, as shown in FIG. 7, the last object detection system 38 can compare the stored average amplitude data to the last 30 data points, however, in other embodiments, other numbers of data points can be used. In some embodiments, the object detection system 38 can compare the stored average amplitude data to the last 30 data points to assess the rate of change in amplitude. Once the object detection system 38 determines the rate of change in amplitude, the rate of change can be compared to stored values for potential targets (e.g., humans, vehicles, aircrafts, etc.) to assess the source of the signal based on the detected rate of change of the signal amplitude.

As shown in FIG. 7, once the object detection system 38 determines a possible source of the signal, the object detection system 38 can then weigh the overall calculation toward that particular object. For example, if the rate of change in amplitude is substantially similar to a stored value that corresponds to a human, the object detection system 38 can weigh additional analysis (e.g., analysis of periodicity and frequency) toward indications that the source of a signal in human.

Then, in some embodiments, the timing and amplitude can be employed to compare the frequency and periodicity of the signal to known signature values (e.g., a 2 Hz frequency and a periodicity of 0.5 seconds for humans). In some embodiments, if the data suggests that the signals may have originated from a human walking near to and/or over the geophones 22, the system 10 can transmit an alert, as discussed in further detail below. Moreover, in some embodiments, perception, detection, and potential identification of targets can be improved if the target becomes immediately adjacent to and/or crosses over the geophones 22 and other portions of the system 10.

Additionally, in some embodiments, the amplitude of the signals can provide further potentially helpful information. For example, in some embodiments, signals generated by several humans traveling together can comprise a generally increased amplitude for a generally increased time period. Furthermore, in some embodiments, an increased amplitude can provide information on the size of the target. For example, because the amplitude can be at least partially proportional to the energy transmitted from the target to the ground as the target travels, the greater the mass of the target, the greater the magnitude of the energy transmitted. As a result, the generally greater the amplitude, the greater the mass of the person and/or the load that the person is carrying. In some embodiments, the system 10 can assess the likelihood that a larger amplitude may be due to a target carrying something (i.e., a package or other cargo). Moreover, in some embodiments, the amplitude associated with a signal can be averaged to further aid in analysis and distinguishing between multiple potential signal sources.

In some embodiments, once the computer system 36 processes and classifies the signals, the resulting data, such as markers indicating the categories detected can be streamed through an internet satellite link, as shown in FIG. 4, via an antenna 40. In one embodiment, the antenna 40 can comprise a 900 MHz antenna 40, although in other embodiments, the antenna 40 can comprise any other suitable configuration and frequency. The resulting data can then be received by an administrator computer or monitoring system (not shown) in communication with the Internet or otherwise connected to the system 10. In some embodiments, data transfer from the geophones 22 to the administrator computer can be streamed in real-time or near-real time.

In one embodiment, some or all of the segments 14 can span a distance of about 5 miles (i.e., with eighteen elements 12 each spanning a distance of about 1,440 feet). In addition, some segments 14 may not be buried in straight lines, and thus, each segment 14 may follow a straight, bent, curved, or otherwise non-linear virtual border line.

As shown in FIG. 4, a block 16 can comprise a plurality of segments 14 (e.g., eighteen) coupled together by cables 24. In one embodiment, some or all of the segments 14 within a block 16 can stream data through the same antenna 40 or multiple antennas 40. Also, in one embodiment, a block 16 can span a distance of between about 80 miles and about 100 miles. In addition, some blocks 16 may not be buried in straight lines, and thus, each block may follow a straight, bent, curved, or otherwise non-linear virtual border line.

Figure 9:
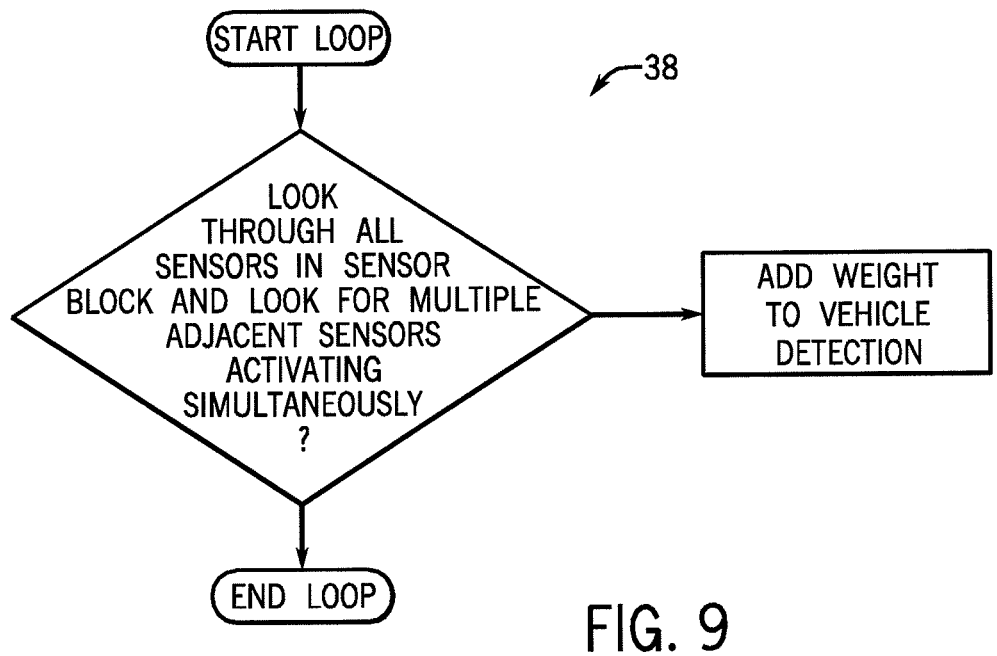
FIG. 9 is a flow chart depicting a portion of object detection system employed by the barrier detection system of FIG. 1.

In some embodiments, the system 10 can be configured and arranged to assess multiple geophone 22 activation. For example, as shown in FIG. 9, the object detection system 38 can access data received from some or all of the geophones 22 in a block 16, element 12, and/or a segment 14 to assess geophone 22 activation in response to a signal. As previously mentioned, larger potential targets (e.g., vehicles) can cause activation of more geophones 22 because of their greater speed and energy transfer to the ground. Accordingly, as a part of the analysis, the object detection system 38 can access data from proximal and distal geophones 22 to see if they transmitted a signal substantially simultaneously. If multiple geophones 22 in a block 16, an element 12, and/or a segment 14 detected activity substantially simultaneously, the object detection system 38 can further weigh the analysis toward the fact that a vehicle may be the source of the signal.

The system 10 can be used in applications such as virtual security and border patrol, among other potential applications. For example, in some embodiments, geophones 22 can be buried along a state or international border (e.g., creating a virtual border line adjacent to the actual border). The geophones 22 can detect an increase in ground movement when objects, such as humans, are approaching and/or crossing the border. The geophones 22 can output voltage signals representative of the ground movement to be processed by the computer system 36 (e.g., via application of the object detection system 38) via the seismographs 18 and the line takeoff units 34. The computer system 36 and/or the seismographs 18 can digitize the voltage signals and analyze the digitized signals to determine movement signatures unique to human and other types of movement. An indication of a category marker (e.g., human movement), the original voltage signals, and/or the processed signals can be streamed in substantially or completely real-time to a border patrol monitoring system (not shown). Some or all of the information streamed can comprise tags or other identifying features that can signify the exact geophone 22, geophone string 26, and/or element 12 providing the signals indicative of human movement.

In some embodiments, portions of the system 10 can be configured and arranged to further assist in detecting movement adjacent to system 10. In some embodiments, at least some portions of the system 10 can be configured and arranged to enable triangulation of a potential target. Some geophones 22 or geophone strings 26 can be disposed in the ground so that the object detection system 38 can assess potential targets relative to some or all of the geophones 22 or geophone strings 26. For example, in some embodiments, the object detections system 38 can be configured to analyze voltage signals coming from the geophones 22 using a conventional triangulation calculation (e.g., determining a potential target's location based on the locations of the geophones 22 and/or geophone strings 26).

In some embodiments, the system 10 can be configured and arranged to enable real-time or near real-time adjustments to the object detection system 38. Under some circumstances, inclement weather or other environmental factors can rapidly change (e.g., a weather system comprising winds, thunder, lightening, and other atmospheric disturbances) that may give rise to false detections. For example, in some embodiments, an oncoming rain and/or thunder storm can give rise to false positives. According, in some embodiments, the barrier detection system 10 can comprise a dynamic feedback loop that can enable the object detection system 38 to adjust to the inclement environment in real time or near real time. As a result, even under some conditions that may give rise to false positives, the system 10 can rapidly adapt to the changing environment to produce valuable data on barrier activity.

In some embodiments, after positioning at least some portions of the barrier detection system 10 within the ground, one or more users can calibrate the system 10. In some embodiments, at least some portions of the system 10 (e.g., elements 12, segments 14, and/or blocks 16) can be positioned in locations with background seismic activity. For example, some portions of the system 10 can be disposed in locations adjacent to roads or other paths commonly traversed by vehicles or can be disposed in regions with natural seismic activity. Accordingly, in order to avoid or reduce the risk of false positive events, the system 10 can be calibrated to take into account natural and/or artificial occurrences of non-border crossing seismic activity. Moreover, in some embodiments, the system 10 can also be calibrated to account for other local conditions. For example, soil densities and other traits can vary among possible locations for installation of the system 10. In some embodiments, in order to account for the potential differences in soil composition and/or density, the system 10 can be calibrated to minimize and/or eliminate background seismic activity. In some embodiments, calibration can comprise measuring known seismic activities and adjusting the object detection system 38 and/or the any other portions of the system 10 to account for any background seismic activity and variations in environment (e.g., soil conditions).

In some embodiments, some or all of the geophone strings 26 of an element 12 can comprise a conventional series configuration. For example, in some embodiments, some or all of the geophones 22 can comprise a positive terminal and a negative terminal. A first cable 24 can be electrically connected to the positive terminals of at least a portion of the geophones 22 and a second cable 24 can be electrically connected to the negative terminals of the same geophones 22. Ends of the first and second cables 24 can be connected to a seismograph 18 to provide the series configuration. In some embodiments, the series configuration can at least partially enhance signal detection because the series configuration can lead to signal amplification (e.g., an increase in voltage as the signal passes to the seismographs 18) as it passes through each successive geophone 22.

In some embodiments, the series configuration can enable summation of signal amplitudes for analysis by down-stream applications. For example, a conventional geophone 22 can detect a target (e.g., a person) moving that is approximately thirty feet away from the geophone 22. In some embodiments, the amplification associated with the series geophone 22 configuration previously mentioned can enable the system 10 (i.e., multiple geophone strings 26 connected to a seismograph 18 in series) to detect potential targets that are as far away as about six hundred feet. As result of this improved range relative to a single conventional geophone 22, the system 10 can detect a potential object sooner than conventional systems, which can allow a greater amount of time to refine and process the data. As a result of the increased time for refinement, the system 10 can transmit a greater amount of data to downstream users that can allow for a more-directed response. For example, because the system 10 can receive data from multiple geophones 22 that can be processed by the computer system 36 applying the object detection system 38, the system 10 can predict within two-hundred forty feet to where the object will cross the boarder and/or encounter the system 10.

In some embodiments, an alarm (not shown) can be activated by the border patrol monitoring system when such markers are received. The monitoring system can determine the area of geophones 22 (e.g., by an analysis of the tags or other identifying features included with the information stream) that detected the specific voltage signals, allowing users to pinpoint the movement with significant accuracy. In some embodiments, the monitoring system can prioritize alarms based on the number of detected objects, the types of detected objects, the weight of detected objects, the location of detected objects such as near military installations, and other characteristics. Border patrol agents can then be sent to the specific areas to seek out the humans or other targets near the border or attempting to cross the border. If the category markers indicated, for example, animals rather than humans, the alarm can remain off or be deactivated if activated.

In some embodiments, a relatively minor amount of data may be streamed to the border patrol monitoring system relative to some conventional border monitoring systems. For example, some conventional systems include video streaming from video cameras along the border. The video feed from the border to the monitoring system can comprise a substantially cumbersome stream of data over a potentially significant distance. However, by providing only signal data and markers, the data feed burden can be significantly reduced. In addition, tampering with the system 10 can be more difficult due to certain system components being substantially buried underground, in comparison to above-ground video cameras.

As previously mentioned, some embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Some portions of the invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor. The computer readable medium can also be distributed over a network coupled computer systems so that the computer readable code may be stored and executed in a distributed fashion.

Although the method operations were described in a specific order, it should be understood that other operations may be performed in between operations, or operations may be adjusted so that they occur at slightly different times, or may be distributed in a system which allows the occurrence of the processing operations at various intervals associated with the processing, as long as the processing of the overlay operations are performed in the desired way. It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A barrier detection system comprising:
a plurality of sensors capable of being coupled in series to at least one seismograph, the seismograph capable of receiving a signal from the plurality of sensors;
a computer system comprising computer storage and a processor, the computer system capable of being in communication with the seismograph so that the computer system receives the signals from the seismograph, the computer system capable of storing at least a portion of the signals in the computer storage; and
an object detection system being stored in the computer storage and being executable by the processor, the object detection system being configured to
select a first portion of the signal to analyze based a predetermined time interval,
create a baseline value for the first portion,
select a plurality of peaks from the first portion,
select a first peak from the plurality of peaks,
compare an amplitude of the first peak to an amplitude threshold value stored in the computer storage so that if the first peak exceeds the amplitude threshold, the remaining peaks of the first portion are compared to the amplitude threshold, and
compare a frequency value and a periodicity value of the plurality of peaks from the first portion to signatures stored in the computer storage to determine an origin of the signal.

2. The barrier detection system of claim 1, wherein the object detection system is configured to determine a rate of change of an amplitude of a portion of the signal.

3. The barrier detection system of claim 1, wherein the seismograph is configured and arranged to convert the signals from an analog format to a digital format.

4. The barrier detection system of claim 1, and further comprising an antenna capable of being coupled to the computer system.

5. The barrier detection system of claim 1, wherein the plurality of sensors comprises a plurality of geophones.

6. The barrier detection system of claim 1, wherein the seismograph comprises six channels.

7. The barrier detection system of claim 6, wherein the plurality of sensors comprises six strings of sensors, and wherein the seismograph is configured and arranged so that each of the six strings of sensors is capable of being in communication with one of the six channels.

8. The barrier detection system of claim 1, wherein the object detection system is further configured to transmit a signal to a monitoring system if the frequency value and the periodicity value of the plurality of peaks from the first portion are substantially similar to the signature corresponding to at least one of a human and a vehicle.

9. The barrier detection system of claim 1, wherein at least a portion of the plurality of sensors are capable of being buried underground.

10. A barrier detection system comprising:
- a plurality of geophones capable of being coupled in series to at least one seismograph to form an element, the seismograph being configured and arranged to receive signals from the plurality of geophones, wherein a plurality of elements are capable of being coupled together to form a segment and a plurality of segments are capable of being coupled together to form a block;
- at least one computer system capable of being coupled to each of the plurality of segments, each computer system comprising computer storage and a processor, each computer system capable of being in communication with the seismograph so that each computer system receives the signals from the seismograph, each computer system being capable of storing at least a portion of the signals in the computer storage; and
- an object detection system being stored in the computer storage and being executable by the processor, the object detection system being configured to
  - select a first portion of the signal to analyze based a predetermined time interval,
  - select at least ten peaks from the first portion,
  - select a first peak from the ten peaks,
  - compare an amplitude of the first peak to an amplitude threshold value stored in the computer storage so that if the first peak exceeds the amplitude threshold, a timer is initiated and the remaining peaks of the ten peaks are compared to the amplitude threshold,
  - compare a frequency value and a periodicity value of the ten peaks from the first portion to signatures stored in the computer storage to determine an origin of the signal, and
  - transmit a signal to a monitoring system if the origin of the signal is determined to be at least one of a vehicle and a human.

11. The barrier detection system of claim 10, wherein the plurality of geophones are capable of being coupled together to form a plurality of geophone strings.

12. The barrier detection system of claim 11, wherein each of the plurality of elements comprises at least six geophone strings.

13. The barrier detection system of claim 12, wherein the seismograph comprises six channels and the seismograph is configured and arranged so that each of the six geophone strings is capable of being in communication with one of the six channels.

14. The barrier detection system of claim 10, wherein the seismograph is configured and arranged to digitize the signal received from the geophones.

15. The barrier detection system of claim 10 and further comprising an antenna capable of being coupled to the computer system.

16. The barrier detection system of claim 10, wherein the computer system is configured and arranged to digitize the signal received from the seismograph.

17. The barrier detection system of claim 10, wherein the object detection system is further configured to create a baseline value for the first portion of the signal.

18. A barrier detection system comprising:
- a plurality of geophones capable of being coupled in series to at least one seismograph to form an element, the seismograph being configured to
  - receive analog signals from the plurality of geophones,
  - process the analog signals by filtering at least a portion of a background signal, and
  - digitize the analog signals;
- a computer system comprising computer storage and a processor, the computer system capable of being in communication with the seismograph so that the computer system receives the digitized signals from the seismograph, the computer system capable of storing at least a portion of the digitized signals in the computer storage; and
- an object detection system being stored in the computer storage and being executable by the processor, the object detection system being configured to
  - select a first portion of the signal to analyze based a predetermined time interval,
  - create a baseline value for the first portion,
  - select a plurality of peaks from the first portion,
  - select a first peak from the plurality of peaks,
  - determine a rate of change of an amplitude of a second portion of the signal and compare the determined rate of change of the amplitude of the second portion to a rate of change threshold value stored in the computer storage,
  - compare a frequency value and a periodicity value of the plurality of peaks from the first portion to signatures stored in the computer storage to determine an origin of the signal, and
  - transmit a signal to a monitoring system if the origin of the signal is determined to be one of a vehicle and a human.

19. The barrier detection system of claim 18, wherein the digitized signals from the seismograph to the computer system comprise a tag.

20. The barrier detection system of claim 19, wherein the tag is configured to enable the computer system to determine a location from which the digitized signal originated.

* * * * *